(12) United States Patent
Yong et al.

(10) Patent No.: US 10,433,353 B2
(45) Date of Patent: Oct. 1, 2019

(54) NEIGHBOR AWARENESS NETWORKING SERVICE DISCOVERY PROXY

(71) Applicant: Apple Inc., Cupertino, CA (US)

(72) Inventors: Su Khiong Yong, Palo Alto, CA (US); Christiaan A. Hartman, San Jose, CA (US); Yong Liu, Campbell, CA (US); Lawrie Kurian, San Jose, CA (US); Peter N. Heerboth, San Jose, CA (US); Guoqing Li, Cupertino, CA (US); Daniel R. Borges, San Francisco, CA (US); Chiu Ngok E. Wong, San Jose, CA (US); Saravanan Balasubramaniyan, Los Gatos, CA (US); Tashbeeb Haque, San Francisco, CA (US); Anand Rajagopalan, Saratoga, CA (US); Andreas Wolf, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 15/065,584

(22) Filed: Mar. 9, 2016

(65) Prior Publication Data
US 2016/0270137 A1   Sep. 15, 2016

Related U.S. Application Data

(60) Provisional application No. 62/130,246, filed on Mar. 9, 2015.

(51) Int. Cl.
*H04W 76/14* (2018.01)
*H04W 4/80* (2018.01)
*H04W 8/00* (2009.01)
*H04W 48/16* (2009.01)
*H04W 4/12* (2009.01)

(52) U.S. Cl.
CPC .......... *H04W 76/14* (2018.02); *H04W 8/005* (2013.01); *H04W 4/12* (2013.01); *H04W 4/80* (2018.02); *H04W 48/16* (2013.01)

(58) Field of Classification Search
CPC ...................................................... H04W 8/005
See application file for complete search history.

(56) References Cited

U.S. PATENT DOCUMENTS

| | | | | |
|---|---|---|---|---|
| 8,867,514 B2* | 10/2014 | Abraham | ............... | H04L 67/16 370/338 |
| 9,485,708 B2* | 11/2016 | Patil | ................ | H04L 67/16 |
| 9,544,376 B1* | 1/2017 | Lambert | ............... | H04L 63/061 |
| 9,544,754 B1* | 1/2017 | Lambert | ............... | H04W 8/005 |
| 9,723,439 B2* | 8/2017 | Segev | ................ | H04W 4/021 |
| 9,763,115 B2* | 9/2017 | Qi | ............... | H04W 24/02 |
| 9,955,523 B2* | 4/2018 | Qi | ............... | H04W 76/27 |

(Continued)

*Primary Examiner* — Asad M Nawaz
*Assistant Examiner* — Berhanu D Belete
(74) *Attorney, Agent, or Firm* — Meyertons Hood Kivlin Kowert and Goetzel PC; Jeffrey C. Hood; Brian E. Moore

(57) ABSTRACT

In some embodiments, one or more wireless stations operate to configure Neighbor Awareness Networking (NAN)—direct communication with neighboring wireless stations without utilizing an intermediate access point. Embodiments of the disclosure relate to aspects of NAN communication, including service discovery proxy registration, publishing, and subscription of services via the proxy, maintenance of the proxy, and de-registration of the proxy.

20 Claims, 11 Drawing Sheets receive, from a first neighboring wireless device, a request to register one or more services for publishing on behalf of the first neighboring wireless device
802 send a confirmation of registration to the first neighboring wireless device
804 publish, on behalf of the first neighboring wireless device, the one or more services
806

(56) References Cited

U.S. PATENT DOCUMENTS

| | | | |
|---|---|---|---|
| 2010/0322213 A1* | 12/2010 | Liu | H04W 48/16 |
| | | | 370/338 |
| 2011/0029659 A1 | 2/2011 | Shah | |
| 2011/0082939 A1 | 4/2011 | Montemurro et al. | |
| 2013/0322297 A1 | 12/2013 | Dominguez | |
| 2014/0269555 A1 | 9/2014 | Sadasivam et al. | |
| 2014/0269658 A1* | 9/2014 | Sadasivam | H04W 72/0406 |
| | | | 370/338 |
| 2015/0036540 A1* | 2/2015 | Kasslin | H04W 48/18 |
| | | | 370/254 |
| 2015/0063208 A1* | 3/2015 | Abraham | H04W 8/02 |
| | | | 370/328 |
| 2015/0071121 A1* | 3/2015 | Patil | H04W 40/24 |
| | | | 370/255 |
| 2015/0081840 A1* | 3/2015 | Patil | H04L 67/28 |
| | | | 709/217 |
| 2015/0098388 A1* | 4/2015 | Fang | H04W 48/16 |
| | | | 370/328 |
| 2015/0200811 A1* | 7/2015 | Kasslin | H04L 41/12 |
| | | | 370/254 |
| 2015/0319675 A1* | 11/2015 | Park | H04W 48/16 |
| | | | 370/338 |
| 2015/0350866 A1* | 12/2015 | Patil | H04W 40/244 |
| | | | 370/254 |
| 2016/0223333 A1* | 8/2016 | Thakur | H04W 40/20 |
| 2016/0234301 A1* | 8/2016 | Qi | H04W 4/80 |
| 2017/0346673 A1* | 11/2017 | Kneckt | H04L 29/08 |

* cited by examiner

NEIGHBOR AWARENESS NETWORKING SERVICE DISCOVERY PROXY

PRIORITY DATA

This application claims benefit of priority to U.S. Provisional Application Ser. No. 62/130,246, titled "Neighbor Awareness Networking Service Discovery Proxy", filed Mar. 9, 2015 by Su Khiong Yong, Christiaan A. Hartman, Yong Liu, Lawrie Kurian, Peter Heerboth, Guoqing Li, Daniel R. Borges, Chiu Ngok E Wong, Saravanan Balasubramaniyan, Tashbeeb Haque, Anand Rajagopalan, and Andreas Wolf, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "wireless stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and methods for publishing of and subscription to services on behalf of a peer wireless device.

Embodiments relate to a wireless station (or device) that includes one or more antennas, one or more radios, and one or more processors coupled to the radios. At least one radio is configured to perform Wi-Fi communications. The wireless station may perform voice and/or data communications, as well as the methods described herein.

In one set of embodiments, one or more wireless stations operate to configure Neighbor Awareness Networking (NAN)—direct communication between neighboring wireless stations, e.g., without utilizing an intermediate access point. Embodiments of the disclosure relate to a NAN service discovery proxy. The NAN service discovery proxy embodiments described herein provide a mechanism through which devices can communicate and provide services. Aspects of the mechanism include service registration process, service publishing, service subscription, service maintenance, and service de-registration process.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
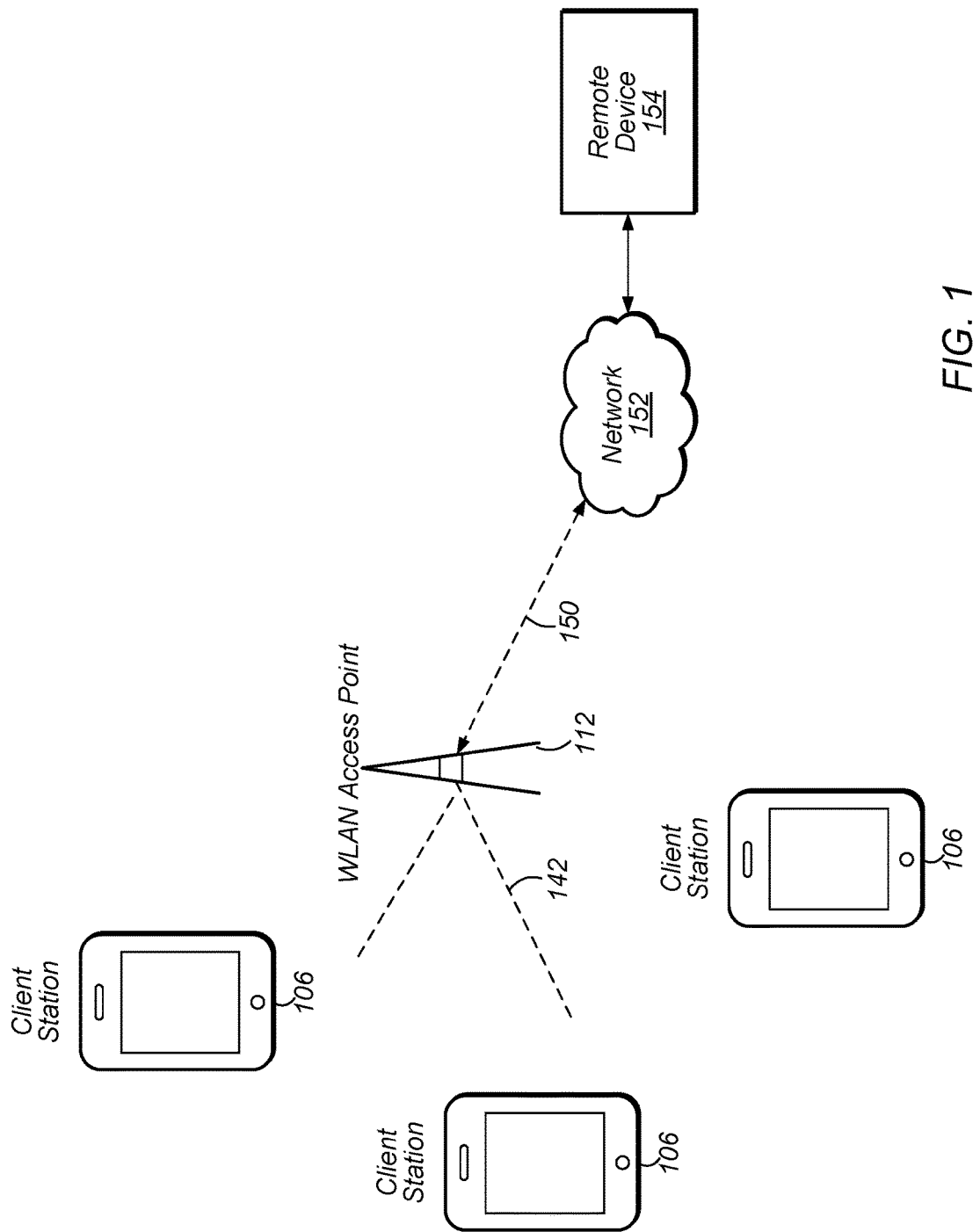
FIG. 1 illustrates an example WLAN system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked (e.g., in communication) via one or more NAN data links. Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one mobile device 106 is configured to communicate directly with one or more neighboring mobile devices, without use of the access point 112.

Figure 2:
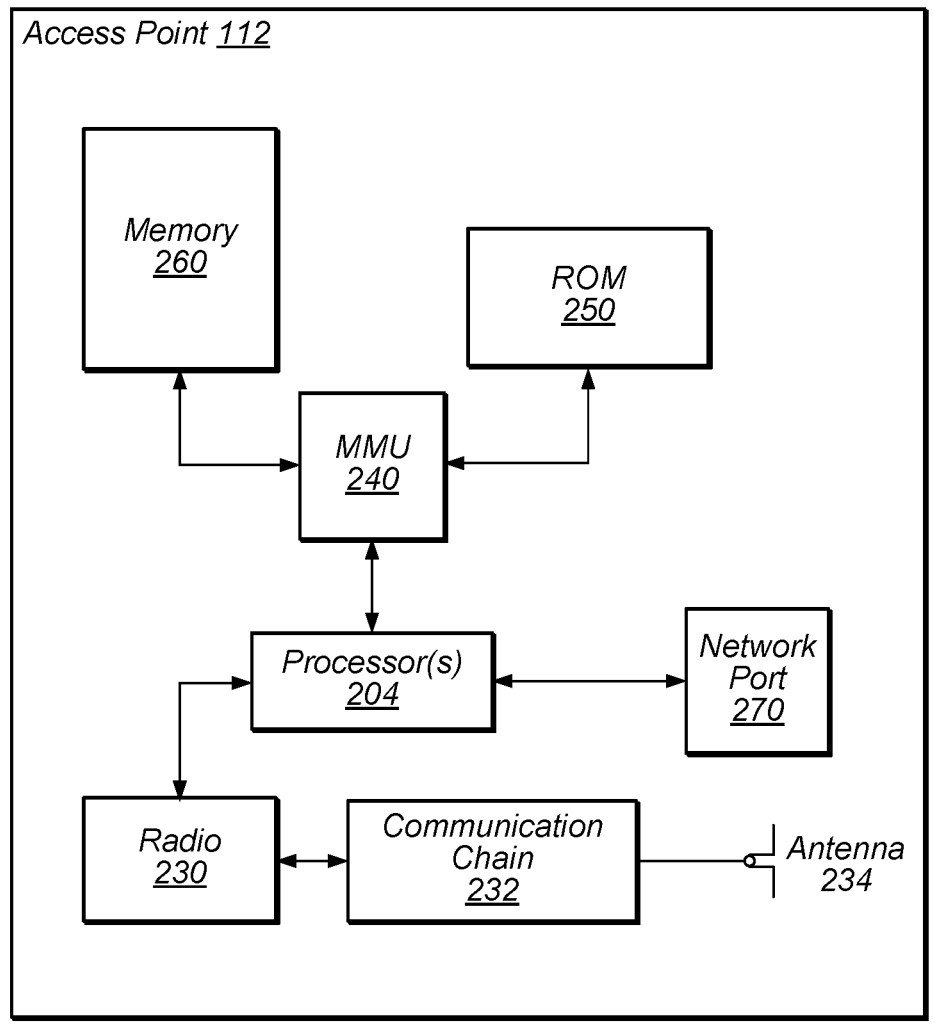
FIG. 2 illustrates a block diagram of an example WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230. The antenna 234 communicates with the wireless communication circuitry 230 via communication chain 232. Communication chain 232 may comprise one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3:
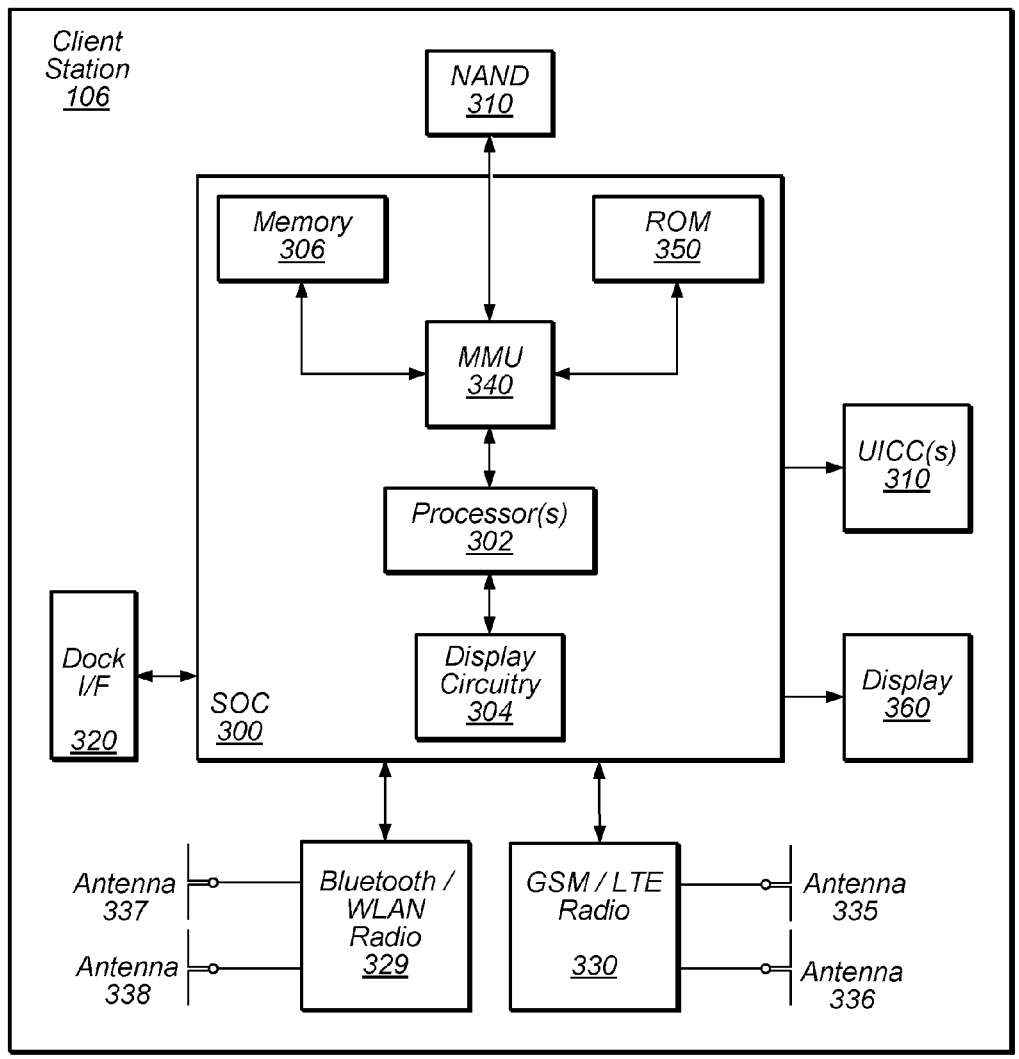
FIG. 3 illustrates an example simplified block diagram of a client station (UE), according to some embodiments.

FIG. 3—Client Station Block Diagram

FIG. 3 illustrates an example simplified block diagram of a client station 106. According to embodiments, client station 106 may be a user equipment device (UE), a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further comprise one or more smart cards 310 that comprise SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may comprise multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the client station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each be comprised of one or more processing elements. In other words, one or more processing elements may be included in cellular communication circuitry 330 and short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station with which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability.

The NAN protocol includes two aspects: 1) synchronization and discovery (NAN 1.0) and 2) datapath transmission (NAN 2.0). NAN 1.0 describes methods for NAN protocol synchronization and discovery. One feature described in NAN 2.0 is a service discovery proxy. A service discovery proxy may be used in a case in which a low power NAN device (LPN) (e.g., a NAN proxy client) may sleep (or hibernate, e.g., discontinue transmissions for a period of time to conserve power) while still being able to be discoverable by other NAN devices in the network via a NAN service discovery proxy (NSDP) (e.g., a NAN proxy server). The NSDP is described as an entity that resides on a NAN device and/or a standalone device to help advertising and/or subscribing on behalf of a sleeping LPN. The current disclosure describes various systems and methods used by a NSDP for service registration, service publishing, service subscription, service maintenance, and service de-registration.

A typical use case in NAN 2.0 may include a group in which a plurality of NAN capable devices, each with varying capabilities, services, or power budgets. In such instances, one or more low power NAN devices (LPNs) may use more capable devices as service registries (e.g., proxies for the LPNs). This may enable the LPNs to sleep for longer time periods while their services are discoverable relatively fast via the service registries of the more capable devices. Thus, when a user enters the group, the user may need to determine what services are available within the group. The user may be able to discover services available from the sleeping LPNs via a device which is active during every NAN discovery window as well as having availability outside the NAN discovery window. Thus, the user may become aware of the services available via the LPNs quickly even if the LPNs are not available during the NAN discovery window. The embodiments described herein provide systems and methods for a device to publish and/or subscribe services on behalf of another device based on a request from the other device. In other words, embodiments described herein provide a framework to enable the above described use case.

NSDP Capability Identification

As described above, a NAN device may serve as a service registry for one or more other NAN devices. Thus, such a device may serve as a NAN service discovery proxy and may support NSDP function. In some embodiments, a NAN device that is NSDP (NAN service discovery proxy) capable may indicate its NSDP capability via at least one of a NAN synchronization beacon, discovery beacon frames, and service discovery frames. In some embodiments, an NSDP (e.g., a NAN proxy server) may advertise a service proxy and/or an LPN (e.g., a NAN proxy client) may subscribe to a service proxy. Such an indication may allow one or more low power NAN devices (LPNs) to register services with the NSDP as described below in more detail. Additionally, a NAN device that is not NSDP capable may discover services of the LPNs via the NSDP capable NAN devices as described below in more detail.

Service Registration

In some embodiments, once an LPN has discovered one or more NSDP devices (e.g., via a broadcast on any of a NAN synchronization beacon, a discovery beacon frame, and/or a service discovery frame), the LPN may register services and associated service information with one of the one or more NSDP devices. Thus, the LPN may register services and then go to sleep (e.g., hibernate or switch to a low power state in which it does not transmit or receive) for a period longer than a time required to maintain synchronization with a NAN cluster in which the LPN participates. In some embodiments, the discoverability of the LPN by the NSDP device may be to publish one or more services of the LPN. In other embodiments, the discoverability of the LPN by the NSDP may be for the NSDP to subscribe to one or more services that are of interest to the LPN.

In some embodiments, a service registration request message may be sent by the LPN to a NSDP device. The service registration message (service registration) request may include a service MAC (e.g., a MAC (medium access control) address of the LPN), a wake up schedule and/or presence mode if the LPN is publishing one or more services, a publish mode of the LPN (e.g., solicited publish, unsolicited publish, or both), a subscribe mode of the LPN (e.g., passive subscribe, active subscribe, or both), a service descriptor which may include a service ID (identification) (e.g., a service hash), an instance ID (e.g., a publish_ID or a subscribe_ID), a requestor instance ID, a further availability map attribute, and/or a service control. Additionally, in some embodiments, the service registration may also include one or more of a wake up schedule and/or presence mode if the LPN is subscribing to one or more services, a further availability map attribute, a requestor instance ID, a subscribe mode of the LPN, a MAC address of the LPN, a service ID, an instance ID, and/or one or more additional fields. Note that depending on the memory capacity of the NSDP device, the NSDP device may discard optional registration information. For example, the NSDP device, to conserve memory, may discard service information the LPN included in the service descriptor included in the registration request message. Note further, however, that matching filter information may not be discarded if a specific requirement is set for publishing and/or subscription.

In an embodiment, the NSDP device may cache the registration information received in the service registration request and may use the registration information for discovery on behalf of the LPN. Note that the NSDP device may take full control of how to subscribe and/or publish on behalf of the LPN. Further, the NSDP device may also take full control of what to subscribe and/or publish on behalf of the LPN. Thus, the NSDP device may have control to alter the type of service publishing/subscription that the LPN device specified in the service registration request as shown below in Table 1.

TABLE 1

|  |  | NSDP Publishing | |
|---|---|---|---|
|  |  | Unsolicited Publish | Solicited Publish |
| LPN Publishing (Request) | Unsolicited Publish | Allowed (honor request) |  |
|  | Solicited Publish | Allowed | Allowed (honor request) |

|  |  | NSDP Subscription | |
|---|---|---|---|
|  |  | Passive Subscribe | Active Subscribe |
| LPN Subscription (Request) | Passive Subscribe | Allowed (honor request) | Allowed |
|  | Active Subscribe |  | Allowed (honor request) |

Thus, as shown in Table 1, if the LPN requests unsolicited publish, the NSDP device may only publish via an unsolicited publish. However, if the LPN requests solicited publish, the NSDP device may publish via either unsolicited or solicited publish. In other words, the NSDP may publish/subscribe differently than originally requested in the service registration request from the LPN. The main benefits are that by altering the type of service publishing/subscription, the NSDP device may aggregate multiple publish/subscribe requests from one or more LPNs so that the NSDP device may perform a more efficient publish/subscribe. However, since there may be publish and subscribe type mismatch (e.g., solicited publish and passive subscribe), the NSDP device may need to inform the original LPN's publish/subscribe type to the NAN device requesting the LPN's service so that the NAN device can ensure a compatible publish and subscribe if the requesting NAN device decides to further pursue subscription/publishing with the LPN.

Service Publishing

In some embodiments, a NSDP device may publish services on behalf of an LPN based on registration information cached in the NSDP device. Thus, in some embodiments, the NSDP device may perform publishing procedures exactly as specified by the LPN in a service registration request as described above if the NSDP device has enough resource to support the publishing procedure as specified.

However, in some embodiments, if the LPN requests an unsolicited publish, the NSDP device may advertise a service ID prior to advertising additional information if the service discovery (SD) frame is insufficient to accommodate the additional information. Thus, after advertising the service ID, the NSDP device may receive a request from a NAN device. The request may be to obtain more information such as a MAC address, a further availability map, and/or a service descriptor, among other information. Alternatively, the NSDP device may advertise all necessary registration information when the SD Frame is insufficient to accommodate all the information and may indicate that additional information is cached in the NSDP memory for the NAN device to query. Further, in another alternative, the NSDP device may advertise services via a Bloom filter which may be followed by a follow-up request by the NAN device to obtain additional information.

Note that in embodiments, the NSDP device may indicate that services advertised are proxied. Additionally, as noted above, the NSDP device may elect to perform solicited or unsolicited publish, or both for LPNs. Table 2 lists possible cases for a NAN device to be either NSDP device aware (receiving and parsing wake up schedule attribute) or NSDP device unaware (may require to transmit wake up schedule attribute) in order to leverage the NSDP device. The cases are described below in detail with reference to FIGS. 4-7.

TABLE 2

Figure 4:
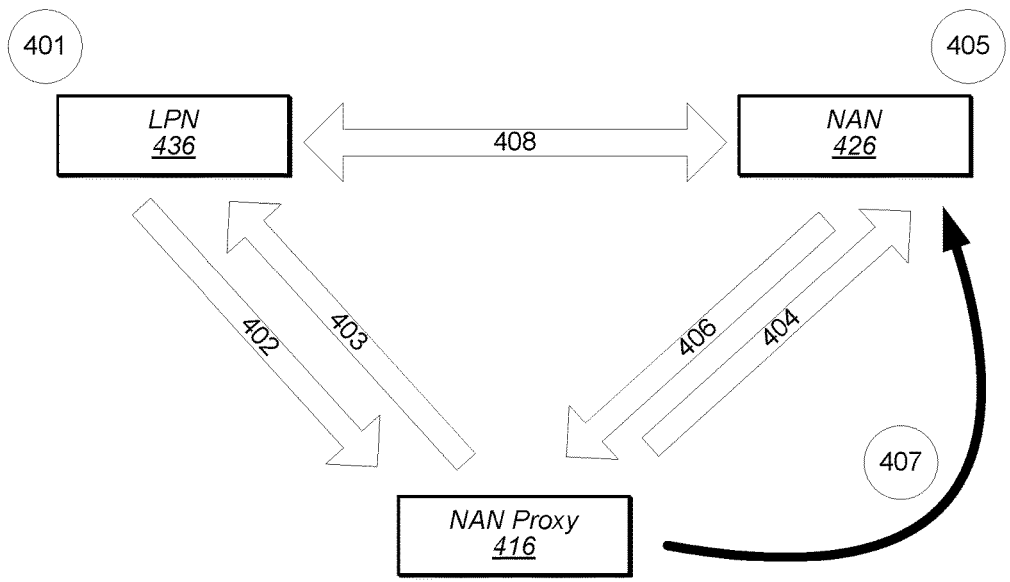
FIG. 4 illustrates an example method for an unsolicited publish of services on behalf of a low power NAN device (LPN) when a NAN device seeking service is NAN service discovery proxy (NSDP) aware, according to some embodiments.
Figure 5:
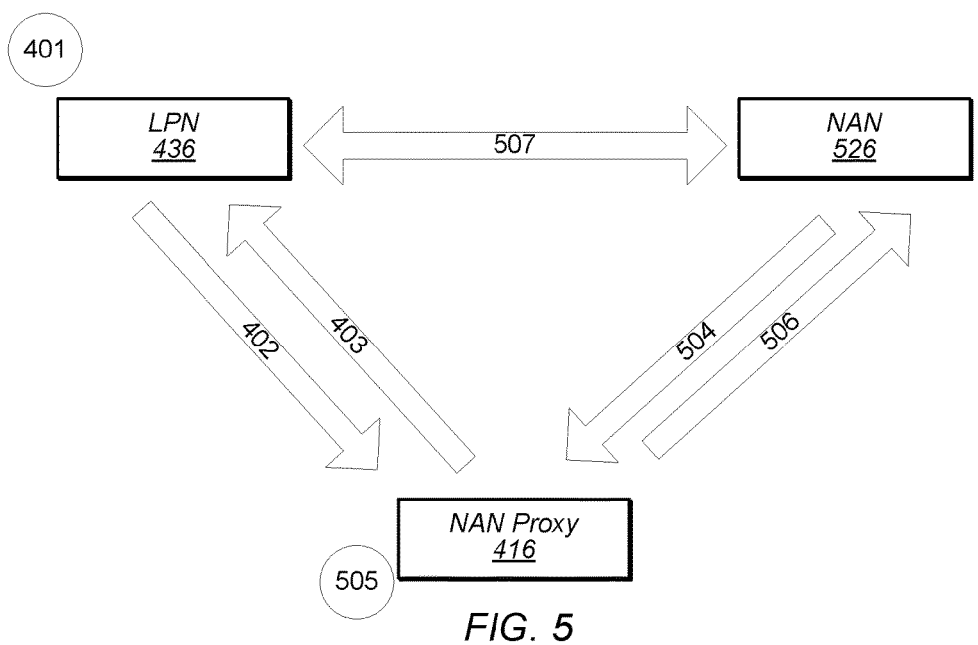
FIG. 5 illustrates an example method for a solicited publish of services on behalf of an LPN when a NAN device seeking service is NSDP aware, according to some embodiments.
Figure 6:
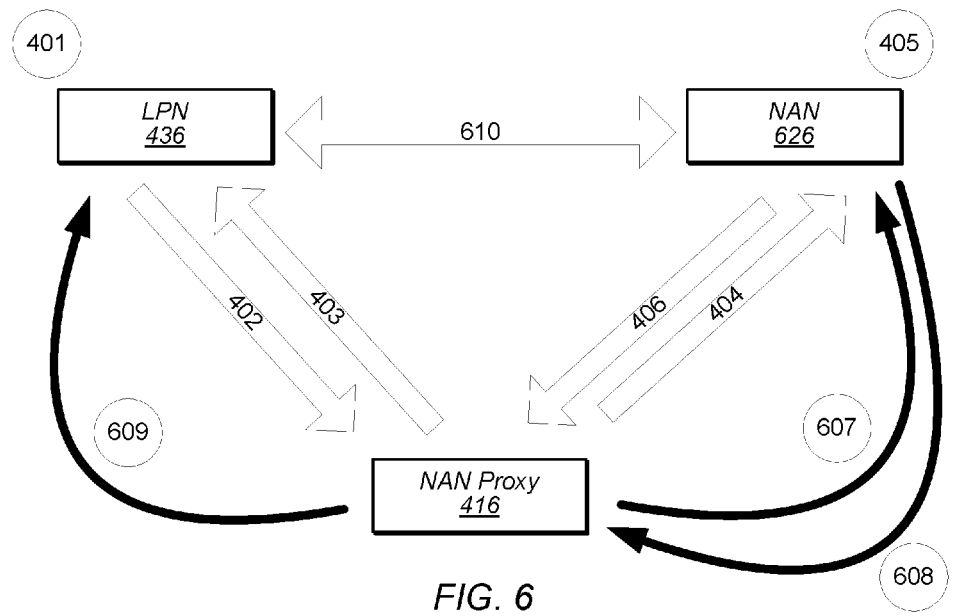
FIG. 6 illustrates an example method for an unsolicited publish of services on behalf of a LPN when a NAN device seeking service is not NSDP aware, according to some embodiments.
Figure 7:
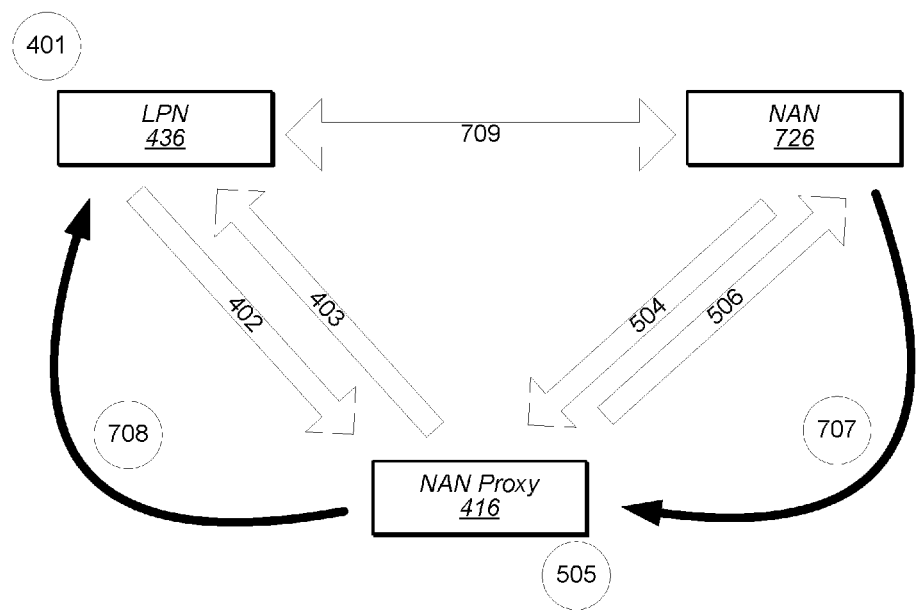
FIG. 7 illustrates an example method for solicited publish of services on behalf of a LPN when a NAN device seeking service is not NSDP aware, according to some embodiments.

|  |  | NAN device - NSDP Aware | | NAN device - NSDP Unaware | |
|---|---|---|---|---|---|
|  |  | Passive Subscribe | Active Subscribe | Passive Subscribe | Active Subscribe |
| NSDP Publishing | Unsolicited Publish | FIG. 4 | FIG. 4 or 5 | FIG. 6 | FIG. 6 or 7 |
|  | Solicited Publish |  | FIG. 5 |  | FIG. 7 |

FIGS. 4 and 6 illustrate embodiments of methods for a NSDP device to perform an unsolicited publish of services on behalf of an LPN. FIG. 4 illustrates a method for an unsolicited publish of services on behalf of an LPN when a NAN device seeking a service is aware of the NSDP device. FIG. 6 illustrates a method for an unsolicited publish of services on behalf of an LPN when a NAN device seeking a service is not aware (unaware) of the NSDP device.

Turning to FIG. 4, the method shown in FIG. 4 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At step 401, LPN device 436 may determine (or decide) to go to sleep (e.g., stop transmitting and receiving for a period of time to conserve power). Thus, at step 402, LPN device 436 may send a service registration request message to NAN proxy 416 which may be an NSDP device. In addition, NAN proxy 416 may include features and components as described above in reference to client station 106. As detailed above, the service registration message (service registration) request may include a service MAC (e.g., a MAC (medium access control) address of LPN device 436), a wake up schedule and/or presence mode if LPN device 436 is publishing one or more services, a publish mode of the LPN (e.g., solicited publish, unsolicited publish, or both), a subscribe mode of the LPN (e.g., passive subscribe, active subscribe, or both), a service descriptor which may include a service ID (identification) (e.g., a service hash), an instance ID (e.g., a publish_ID or a subscribe_ID), a requestor instance ID, and/or a service control. Additionally, in some embodiments, the service registration message may also include one or more of a wake up schedule and/or presence mode if LPN device 436 is subscribing to one or more services, a further availability map attribute, a requestor instance ID, and one or more additional fields. Note that depending on the memory capacity of NAN proxy 416, NAN proxy 416 may discard optional registration information. For example, NAN proxy 416, to conserve memory, may discard service information LPN device 436 included in the service descriptor included in the registration request message. Note further, however, that matching filter information may not be discarded if a specific requirement is set for publishing and/or subscription. At step 403, NAN proxy 416 may send LPN device 436 a confirmation of registration message.

At step 404, NAN proxy 416 may send information of LPN device 436 such as a wake-up schedule and a MAC address to NAN device 426. At step 405, NAN device 426 may determine a service match and may request more service information from NAN proxy 416 at step 406. In response, NAN proxy 416 may send additional service information to NAN device 426 at step 407. Then, based on the additional service information, NAN device 426 may proceed to meet LPN device 436 at a next wake up discovery window or a next available channel/time window of LPN device 436 (e.g., NAN device 426 may meet LPN device 436 at a specified instance (channel and time) when LPN device 436 will awake), to subscribe to the service. Note that in some embodiments, if NAN proxy 416 includes the additional service information in the unsolicited publish (step 404), then the exchange of information at steps 406 and 407 may not be necessary and NAN device 426 may proceed to meet LPN device 436 when it wakes up at step 408 after determining a service match at step 405.

Turning to FIG. 6, the method shown in FIG. 6 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. In addition, NAN proxy 416 may send information of LPN device 436 such as a wake-up schedule and a MAC address to NAN device 626 at step 404 and, at step 405, NAN device 626 may determine a service match and may request more service information from NAN proxy 416 at step 406. In response, the NAN proxy 416 may send additional service information to NAN device 626 at step 607. Then, at step 608, NAN device 626 may confirm an intent to subscribe and may send NAN proxy 416 information regarding NAN device 626, such as NAN device 626's wake-up schedule and MAC address. At step 609, the NAN proxy 416 may pass NAN device 626's information to LPN device 436 when LPN device 436 wakes up. At step 610, based on NAN device 626's information received at LPN device 436, LPN device 436 may meet NAN device 626 at a next wake up discovery window or a next available channel/time window of NAN device 626 and NAN device 626 may subscribe to LPN device 436's published service.

FIGS. 5 and 7 illustrate embodiments of methods for a NSDP to perform a solicited publish of services on behalf of an LPN. In such embodiments the NSDP device may wait for a request from a NAN device (e.g., an active subscriber) and may respond to the request with additional service information. FIG. 5 illustrates a method for a solicited publish of services on behalf of an LPN when a NAN device seeking a service is aware of the NSDP. FIG. 7 illustrates a method for a solicited publish of services on behalf of an LPN when a NAN device seeking a service is not aware (unaware) of the NSDP.

Turning to FIG. 5, the method shown in FIG. 5 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. At step 504, NAN proxy 416 may receive a subscription request from NAN device 526 and determine a service match at step 505. At step 506, the NAN proxy 416 may respond to NAN device 526 with service information on behalf of LPN device 436. Then, at step 507, based on the service information, NAN device 526 may proceed to meet LPN device 436 at a next wake up discovery window or a next available channel/time window of LPN device 436 (e.g., NAN device 526 may meet LPN device 436 at a specified instance (channel and time) when LPN device 436 will awake), to subscribe to the service.

Turning to FIG. 7, the method shown in FIG. 7 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. At step 504, NAN proxy 416 may receive a subscription request from NAN device 726 and determine a service match at step 505. At step 506, the NAN proxy 416 may respond to NAN device 726 with service information on behalf of LPN device 436. Then, at step 707, NAN device 726 may confirm an intent to subscribe and may send NAN proxy 416 information regarding NAN device 726, such as NAN device 726's wake-up schedule and MAC address. At step 708, NAN proxy 416 may pass NAN device 726's information to LPN device 436 when LPN device 436 wakes up. At step 709, based on NAN device 726's information received at LPN device 436, LPN device 436 may meet NAN device 726 at a next wake up discovery window or a next available channel/time window of NAN device 726, and NAN device 726 may subscribe to LPN device 436's published service.

Figure 8A:
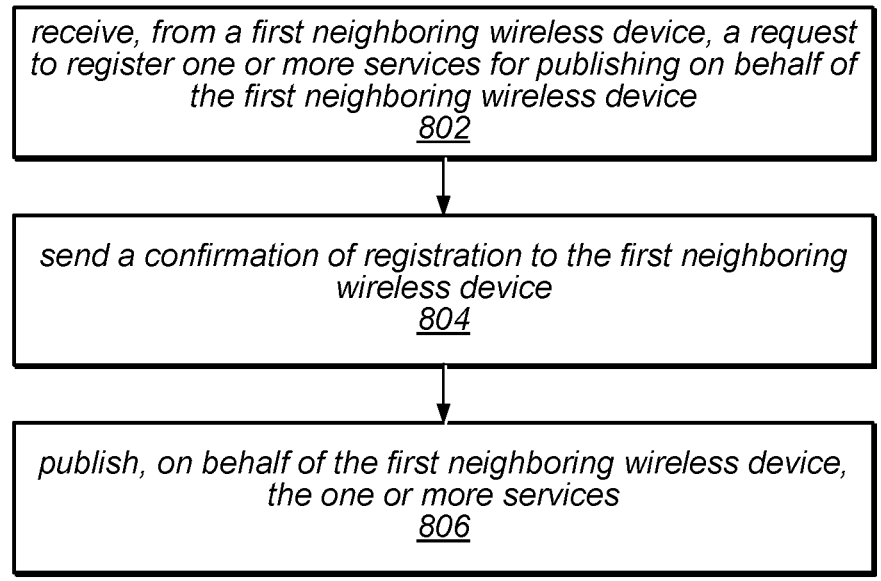
FIG. 8A illustrates an example method for registering and publishing services on behalf of a wireless device, according to some embodiments.

FIG. 8A illustrates a method for registering and publishing services on behalf of a wireless device, according to some embodiments. The method shown in FIG. 8A may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At 802, a request to register one or more services for publishing on behalf of a peer wireless device may be received. In other words, a first neighboring (or peer) wireless device (e.g., LPN device 436) may send a service registration request to a peer wireless device (e.g., NAN proxy 416) as described above. The request may include at least an availability schedule of the peer (or neighboring) wireless device. In some embodiments, the request may include service information or a portion of service information, such as that described above in reference to FIGS. 4-7. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 4-7.

At 804, a confirmation of registration of the one or more services may be sent to the peer wireless device. In response to the confirmation, the peer wireless device may enter a hibernation (or sleep) mode (e.g., discontinue or pause transmission and receiving for a period of time) according to its wakeup schedule.

At 806, the one or more services may be published on behalf the peer wireless device. In some embodiments, publishing the one or more services may include a broadcast message and/or a unicast message advertising the availability of the one or more services to peer (or neighboring) wireless devices within range of the peer wireless device. In some embodiments, publishing the one or more services may include sending, to a neighboring wireless device, service information, or a portion of service information, of the peer wireless device. The service information may be based on the request to register. In other words, information included in the request to register may be used to generate (or determine) the service information sent to the neighboring wireless device.

In some embodiments, publishing the one or more services may include receiving, from a neighboring wireless device, a subscription request and determining a service match to at least one of the one or more services. The service match may be determined based on at least the subscription request and, in some embodiments, a comparison of the subscription request to information included in the request to register. Further, service information may be sent to the neighboring wireless device based on the subscription request.

In some embodiments, the neighboring wireless device may then use the service information to meet (or rendezvous) with the peer device based on schedule information that may be included in the service information (e.g., awake or wake up time as well as channel/frequency/time availability of the peer device). Additionally, in some embodiments, a message may be received from the neighboring wireless device indicating the neighboring wireless device's intent to subscribe to the at least one service. The message may include an availability schedule (e.g., a further availability parameter and/or a further availability schedule) of the neighboring wireless device. The availability schedule may then be sent to the peer device in another message. In some embodiments, the availability schedule may be sent based on the peer wireless device's wakeup schedule. In other words, the availability schedule may be cached (or stored) for a period of time after it is received from the neighboring wireless device prior to sending to the peer wireless device.

In some embodiments, a request for further service information (e.g., if only a portion of the service information was included in the publishing of the one or more services) and, in response, the additional (or further) service information may be send to the neighboring wireless device. In some embodiments, the additional service information may include one or more (or at least one) of a wakeup schedule of the peer wireless device and/or a next available channel and time window of the peer wireless device.

In some embodiments, a service update request may be sent to the peer wireless device. The service update request may be sent according to the availability schedule of the peer wireless device. In addition, the service update for the at least one service may be received from the peer wireless device and service information associated with the at least one service may be updated based on the service update.

Figure 8B:
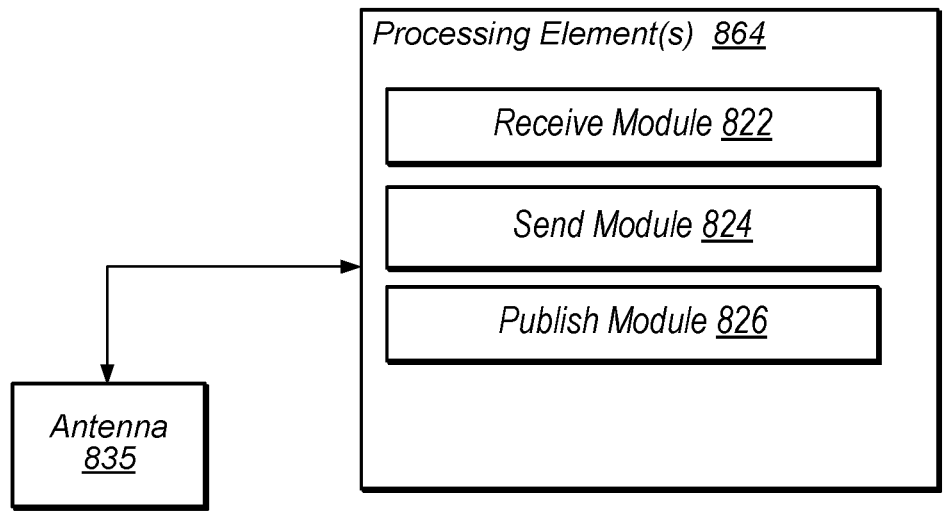
FIG. 8B illustrates an example processing element including modules for registering and publishing services on behalf of a wireless device, according to some embodiments.

FIG. 8B illustrates a processing element including modules for registering and publishing services on behalf of a wireless device, according to some embodiments. In some embodiments, antenna 835 may be coupled to processing element 864. The processing element may be configured to perform the method described above in reference to FIG. 8A. In some embodiments, processing element 864 may include one or more modules, such as modules (or circuitry) 822-826, and the modules (or circuitry) may be configured to perform various steps of the method described above in reference to FIG. 8A. In some embodiments, the processing element may be included in a wireless device, such as wireless station 106. In other embodiments, the processing element may be included in a radio module of a wireless device, such as wireless station 106. In other words, the processing element may be a baseband processor and may be coupled to one or more antennas of a wireless device or one or more receive and/or transmit chains of a wireless device. As shown, the modules may be configured as follows.

In some embodiments, processing element 864 may include a receive module 822 configured to receive a request to register one or more services for publishing on behalf of a peer wireless device. The request may include at least an availability schedule of the peer (or neighboring) wireless device. In some embodiments, the request may include service information or a portion of service information, such as that described above in reference to FIGS. 4-7. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 4-7.

In some embodiments, processing element 864 may include a send module 824 configured to send a confirmation of registration of the one or more services to the peer wireless device. In response to the confirmation, the peer wireless device may enter a hibernation (or sleep) mode (e.g., discontinue or pause transmission and receiving for a period of time) according to its wakeup schedule.

In some embodiments, processing element 864 may include a publish module 826 configured to publish the one or more services on behalf the peer wireless device. In some embodiments, publishing the one or more services may include a broadcast message and/or a unicast message advertising the availability of the one or more services to peer (or neighboring) wireless devices within range of the peer wireless device. In some embodiments, publishing the one or more services may include sending, to a neighboring wireless device, service information, or a portion of service information, of the peer wireless device. The service information may be based on the request to register. In other words, information included in the request to register may be used to generate (or determine) the service information sent to the neighboring wireless device.

In some embodiments, publishing the one or more services may include receiving, from a neighboring wireless device, a subscription request and determining a service match to at least one of the one or more services. The service match may be determined based on at least the subscription request and, in some embodiments, a comparison of the subscription request to information included in the request to register. Further, service information may be sent to the neighboring wireless device based on the subscription request.

In some embodiments, the neighboring wireless device may then use the service information to meet (or rendezvous) with the peer device based on schedule information that may be included in the service information (e.g., awake or wake up time as well as channel/frequency/time availability of the peer device). Additionally, in some embodiment, a message may be received from the neighboring wireless device indicating the neighboring wireless device's intent to subscribe to the at least one service. The message may include an availability schedule (e.g., a further availability parameter and/or a further availability schedule) of the neighboring wireless device. The availability schedule may then be sent to the peer device in another message. In some embodiments, the availability schedule may be sent based on the peer wireless device's wakeup schedule. In other words, the availability schedule may be cached (or stored) for a period of time after it is received from the neighboring wireless device prior to sending to the peer wireless device.

In some embodiments, a request for further service information (e.g., if only a portion of the service information was included in the publishing of the one or more services) may be received and, in response, the additional (or further) service information may be sent to the neighboring wireless device. In some embodiments, the additional service information may include one or more (or at least one) of a wakeup schedule of the peer wireless device and/or a next available channel and time window of the peer wireless device.

In some embodiments, a service update request may be sent to the peer wireless device. The service update request may be sent according to the availability schedule of the peer wireless device. In addition, the service update for the at least one service may be received from the peer wireless device and service information associated with the at least one service may be updated based on the service update.

It is apparent for those skilled in the art that, for the particular processes of the modules (or circuitry) described above (such as modules 822, 824, and 826), reference may be made to the corresponding steps (such as steps 802, 804, and 806, respectively) in the related process embodiment sharing the same concept and the reference is regarded as the disclosure of the related modules (or circuitry) as well. Furthermore, processing element 864 may be implemented in software, hardware or combination thereof. More specifically, processing element 864 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 864 may be implemented as a general-purpose processor such as a CPU, and therefore each module can be implemented with the CPU executing instructions stored in a memory which perform a respective step.

Service Subscription

In some embodiments, a NSDP device may subscribe to services on behalf of an LPN based on registration information cached in the NSDP device. Thus, in some embodiments, the NSDP device may perform subscribing procedures exactly as specified by the LPN in a service registration request as described above if the NSDP device has enough resource to support the publishing procedure as specified.

However, in some embodiments, the NSDP device may wait for a request or listen to beacons and/or requests from one or more NAN devices (e.g., requestors). Then, the NSDP device may respond to the beacon/request from a NAN device with a request for additional information regarding a service and the NAN device may respond with the additional information. In some embodiments, the NSDP device may send a service discover (SD) frame with a service ID to a NAN device and the NAN device may respond with a service descriptor corresponding to the service ID requested.

Note that in some embodiments, the NSDP device may indicate that services are proxied. Additionally, a NAN device may provide a time to live (TTL) for a published service so that the NSDP device may determine if the published service will still be valid when the LPN wakes up, and, further, whether to send the proxied service to the LPN. Additionally, as noted above, the NSDP device may elect to perform active subscribe or passive subscribe, or both for LPNs. Table 3 lists possible cases for a NAN device to be either NSDP device aware (receiving and parsing wake up schedule attribute) or NSDP device unaware (may require to transmit wake up schedule attribute) in order to leverage the NSDP device. The cases are described below in detail with reference to FIGS. 9-13.

TABLE 3

Figure 9:
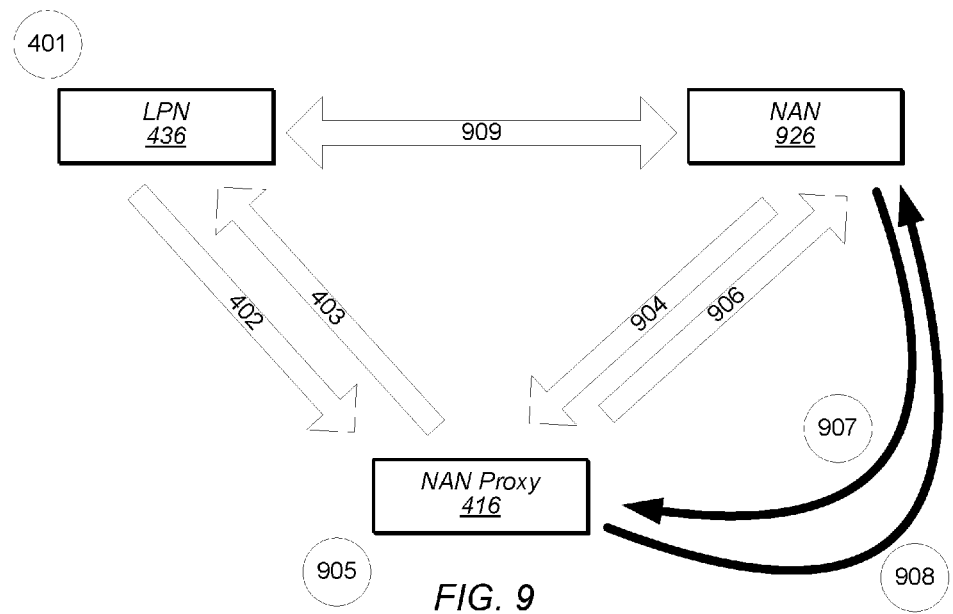
FIG. 9 illustrates an example method for a passive subscribe to a service on behalf of an LPN when a NAN device publishing (solicited or unsolicited) the service is aware of the NSDP device.
Figure 10:
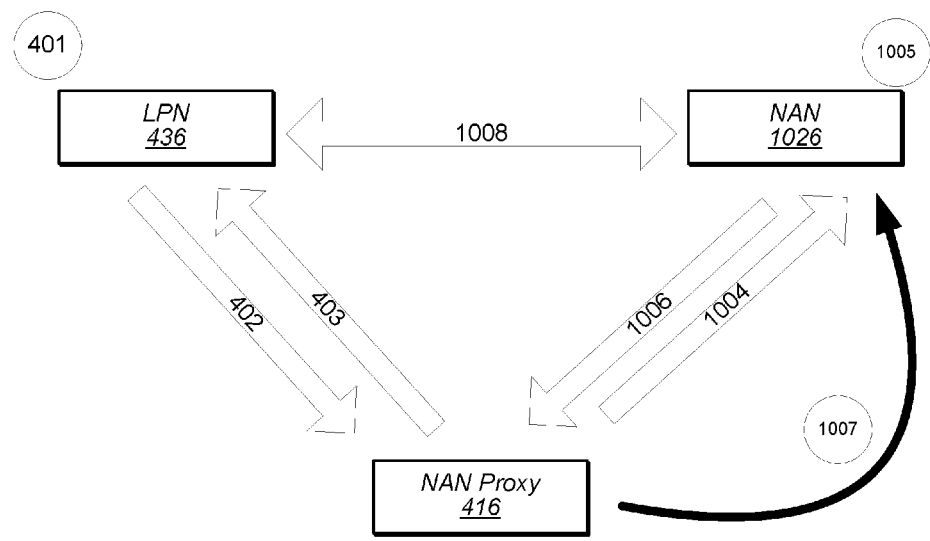
FIG. 10 illustrates an example method for an active subscribe to a service on behalf of an LPN when a NAN device publishing (solicited or unsolicited) the service is aware of the NSDP device, according to some embodiments.
Figure 11:
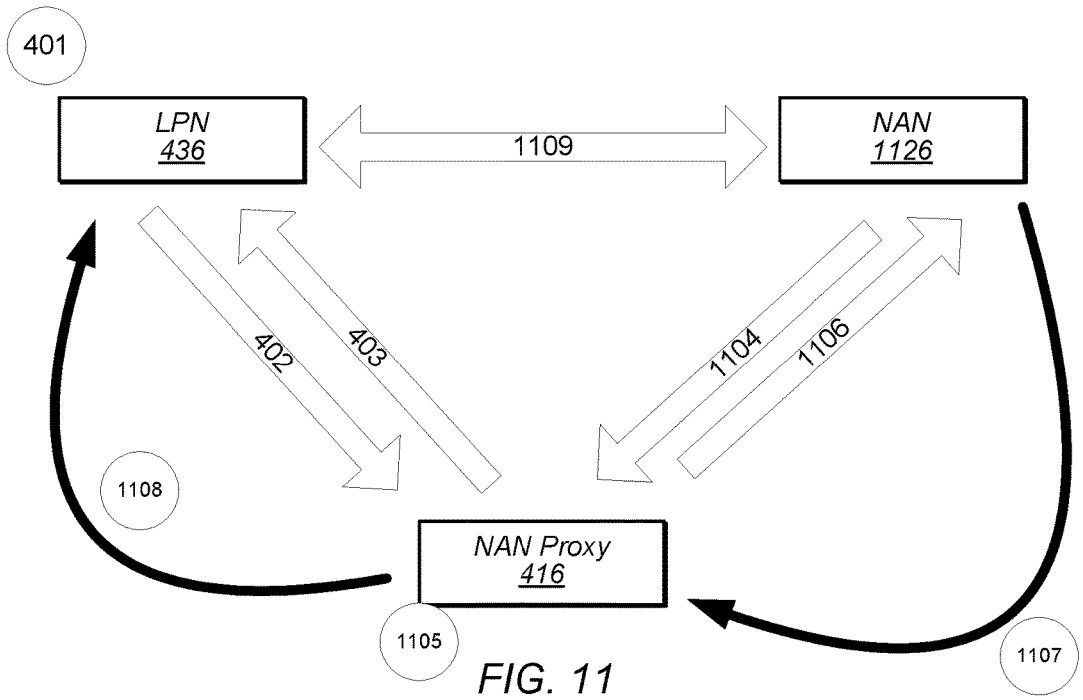
FIG. 11 illustrates an example method for a passive subscribe to a service on behalf of an LPN when a NAN device publishing (unsolicited) is not aware (unaware) of the NSDP device.
Figure 12:
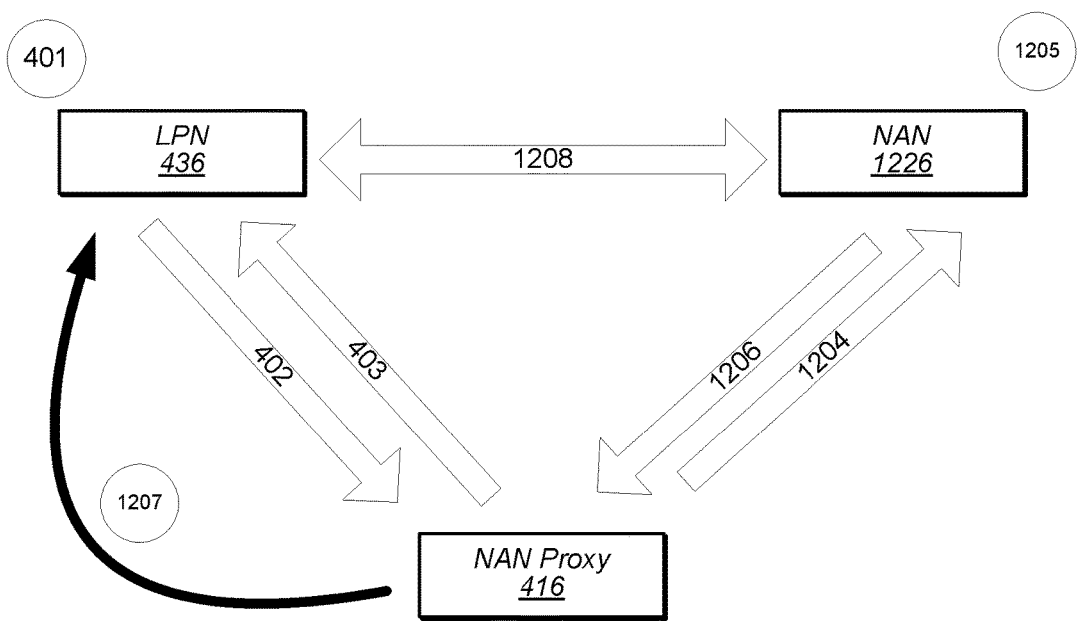
FIG. 12 illustrates an example method for an active subscribe to a service on behalf of an LPN when a NAN device publishing (unsolicited) is not aware (unaware) of the NSDP device, according to some embodiments.
Figure 13:
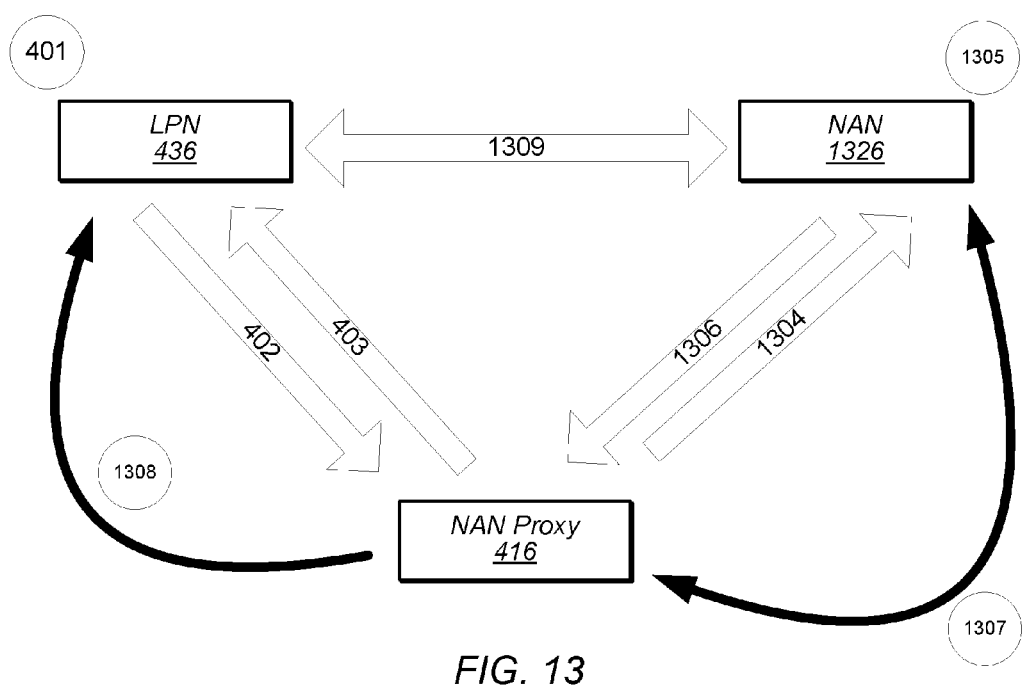
FIG. 13 illustrates another example method for an active subscribe to a service on behalf of an LPN when a NAN device publishing (unsolicited) is not aware (unaware) of the NSDP device, according to some embodiments.

| | | NAN device - NSDP Aware | | NAN device - NSDP Unaware | |
|---|---|---|---|---|---|
| | | Unsolicited Publish | Solicited Publish | Unsolicited Publish | Solicited Publish |
| NSDP Subscribing | Passive Subscribe | FIG. 9 | | FIG. 11 | |
| | Active Subscribe | FIG. 9 or 10 | FIG. 10 | FIG. 11, 12, or 13 | FIG. 12 or 13 |

FIGS. 9 and 11 illustrate embodiments of methods for a NSDP device to perform a passive subscribe to services on behalf of an LPN. FIG. 9 illustrates a method for a passive subscribe to a service on behalf of an LPN when a NAN device publishing (solicited or unsolicited) the service is aware of the NSDP device. FIG. 11 illustrates a method for a passive subscribe to a service on behalf of an LPN when a NAN device publishing (unsolicited) is not aware (unaware) of the NSDP device.

Turning to FIG. 9, the method shown in FIG. 9 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At step 401, LPN device 436 may determine (or decide) to go to sleep (e.g., stop transmitting and receiving for a period of time to conserve power). Thus, at step 402, LPN device 436 may send a service registration request message to NAN proxy 416 which may be an NSDP device. In addition, NAN proxy 416 may include features and components as described above in reference to client station 106. As detailed above, the service registration message (service registration) request may include a service MAC (e.g., a MAC (medium access control) address of LPN device 436), a wake up schedule and/or presence mode if LPN device 436 is publishing one or more services, a publish mode of the LPN (e.g., solicited publish, unsolicited publish, or both), a subscribe mode of the LPN (e.g., passive subscribe, active subscribe, or both), a service descriptor which may include a service ID (identification) (e.g., a service hash), an instance ID (e.g., a publish_ID or a subscribe_ID), a requestor instance ID, and/or a service control. Additionally, in some embodiments, the service registration message may also include one or more of a wake up schedule and/or presence mode if LPN device 436 is subscribing to one or more services, a further availability map attribute, a requestor instance ID, and one or more additional fields. Note that depending on the memory capacity of NAN proxy 416, NAN proxy 416 may discard optional registration information. For example, NAN proxy 416, to conserve memory, may discard service information LPN device 436 included in the service descriptor included in the registration request message. Note further, however, that matching filter information may not be discarded if a specific requirement is set for publishing and/or subscription. At step 403, NAN proxy 416 may send LPN device 436 a confirmation of registration message.

At step 904, NAN proxy 416 may receive an unsolicited or solicited publish of a service from NAN device 926 and may determine a service match at step 905. In response, NAN proxy 416 may request service information at step 906 and may receive the service information from NAN device 926 at step 907. In response, NAN proxy 416 may confirm to NAN device 926 an intent of LPN device 436 to subscribe to a published service by including information of the LPN, such as wake-up schedule and MAC address, in a service request message at step 908. Then, at step 909, based on the information, NAN device 926 may meet LPN device 436 at a next wake up discovery window or a next available channel/time windows when LPN device 436 awakes in order to publish its service for LPN device 436 to subscribe. Note that in some embodiments, if NAN device 926 includes its wake up schedule at step 904, then the exchange of information at steps 906 and 907 may not be necessary.

Turning to FIG. 11, the method shown in FIG. 11 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. In addition, NAN proxy 416 may receive an unsolicited or solicited publish of a service from NAN device 1126 and may determine a service match at step 1105. In response, NAN proxy 416 may request service information at step 1106 and may receive the service information from NAN device 1126 at step 1107. In response, NAN proxy 416 may notify LPN device 436 (when it wakes up) about the NAN device service matched and NAN device 1126's associated information such as wake-up schedule and MAC address at step 1108. Then, at step 1109, based on the information, LPN device 436 may meet NAN device 1126 at a next wake up discovery window or a next available channel/time window of NAN device 1126 and then may subscribe to NAN device 1126's published service. Note that in some embodiments, if NAN device 1126 includes its wake up schedule at step 1104, then the exchange of information at steps 1106 and 1107 may not be necessary.

FIGS. 10, 12, and 13 illustrate embodiments of methods for a NSDP device, such as NAN proxy 416, to perform an active subscribe to services on behalf of an LPN, such as LPN 436. FIG. 10 illustrates a method for an active subscribe to a service on behalf of an LPN when a NAN device publishing (solicited or unsolicited) the service is aware of the NSDP device. FIGS. 12 and 13 illustrate methods for an active subscribe to a service on behalf of an LPN when a NAN device publishing (unsolicited) is not aware (unaware) of the NSDP device.

Turning to FIG. 10, the method shown in FIG. 10 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. At step 1004, NAN proxy 416 may seek compatible services on behalf of LPN device 436 and NAN device 1026 may determine a service match at step 1005. In response, NAN device 1026 may send service information at step 1006 and, at step 1007, NAN proxy 416 may confirm to NAN device 1026 an intent of LPN device 436 to subscribe to a published service by including information of LPN device 436, such as wake-up schedule and MAC address. Then, at step 1008, based on the information, NAN device 1026 may meet LPN device 436 at a next wake up discovery window or a next available channel/time windows when LPN device 436 awakes in order to publish its service for LPN device 436 to subscribe.

Turning to FIG. 12, the method shown in FIG. 12 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. At step 1204, the NAN proxy 416 may seek compatible services on behalf of LPN device 436 and NAN device 1226 may determine a service match at step 1205. In response, NAN device 1226 may send service information at step 1206 and, at step 1207 NAN proxy 416 may notify LPN device 436 (when it wakes up) about NAN device 1226 service matched and its associated information such as wake-up schedule and MAC address. Then, at step 1208, based on the information, LPN device 436 may meet NAN device 1226 at a next wake up discovery window or a next available channel/time window of NAN device 1226 and then may subscribe the NAN device 1226's published service.

Turning to FIG. 13, the method shown in FIG. 13 may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

As described above, at step 401 LPN device 436 may determine to go to sleep (or hibernate) and may send a service registration request (at step 402) to NAN proxy 416 and NAN proxy 416 may confirm the service registration at step 403. At step 1304, NAN proxy 416 may seek compatible services on behalf of LPN device 436 and NAN device 1326 may determine a service match at step 1305. In response, NAN device 1326 may send service information at step 1306 and, at step 1307 NAN proxy 416 may negotiate with NAN device 1326 and may setup a datapath on behalf of LPN device 436. Then, at step 1308, the NAN proxy 416 may notify LPN device 436 about negotiated parameters (e.g., parameters of the datapath negotiated). At step 1309, based on the negotiated parameters, LPN device 436 may meet NAN device 1326 at a next wake up discovery window or a next available channel/time windows of NAN device 1326 in order to subscribe the service published by NAN device 1326.

Figure 14A:
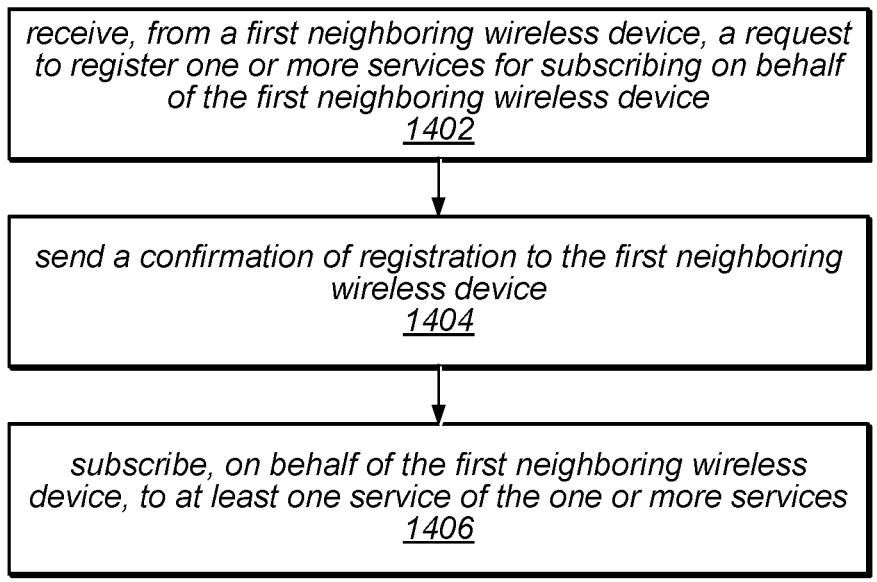
FIG. 14A illustrates an example method for registering and subscribing to services on behalf of a wireless device, according to some embodiments.

FIG. 14A illustrates a method for registering and subscribing to services on behalf of a wireless device, according to some embodiments. The method shown in FIG. 14A may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At 1402, a request to register one or more services for subscribing on behalf of a peer wireless device may be received. In other words, a first neighboring (or peer) wireless device (e.g., LPN device 436) may send a service registration request to a peer wireless device (e.g., NAN proxy 416) as described above. The request may include at least an availability schedule of the peer (or neighboring) wireless device. In some embodiments, the request may include service information or a portion of service information, such as that described above in reference to FIGS. 9-13. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 9-13.

At 1404, a confirmation of registration of the one or more services may be sent to the peer wireless device. In response to the confirmation, the peer wireless device may enter a hibernation (or sleep) mode (e.g., discontinue or pause transmission and receiving for a period of time) according to its wakeup schedule.

At 1406, at least one service of the one or more services may be subscribed to on behalf of the peer wireless device. The at least one service may be provided by a neighboring wireless device. In some embodiments, subscribing to the at least one service may include responding to a broadcast message and/or a unicast message advertising the availability of the at least one service. In some embodiments, subscribing to the at least one service may include sending, to the neighboring wireless device, service information, or a portion of service information, of the peer wireless device. The service information may be based on the request to register. In other words, information included in the request to register may be used to generate (or determine) the service information sent to the neighboring wireless device.

In some embodiments, subscribing to the at least one service may include sending, to the neighboring wireless device, a subscription request and/or determining a service match to at least one service based on information received from the neighboring wireless device. The service match may be determined based on at least information received from the neighboring wireless device and, in some embodiments, a comparison of the information received to information included in the request to register.

In some embodiments, the neighboring wireless device may then use the service information to meet (or rendezvous) with the peer device based on schedule information that may be included in the service information (e.g., awake or wake up time as well as channel/frequency/time availability of the peer device). Additionally, in some embodiment, a message may be sent to the neighboring wireless device indicating the peer wireless device's intent to subscribe to the at least one service. The message may include an availability schedule (e.g., a further availability parameter and/or a further availability schedule) of the peer wireless device. In some embodiments, the availability schedule may be sent based on the peer wireless device's wakeup schedule.

In some embodiments, a request for further service may be received and, in response, the additional (or further) service information may be sent to the neighboring wireless device. In some embodiments, the additional service information may include one or more (or at least one) of a wakeup schedule of the peer wireless device and/or a next available channel and time window of the peer wireless device.

In some embodiments, a service update request may be sent to the peer wireless device. The service update request may be sent according to the availability schedule of the peer wireless device. In addition, the service update for the at least one service may be received from the peer wireless device and service information associated with the at least one service may be updated based on the service update.

Figure 14B:
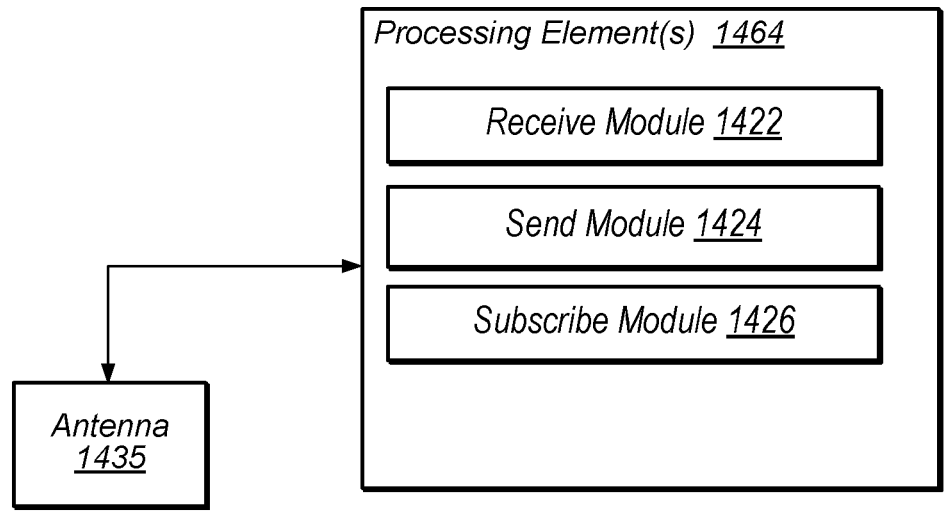
FIG. 14B illustrates an example processing element including modules for registering and subscribing to services on behalf of a wireless device, according to some embodiments.

FIG. 14B illustrates a processing element including modules for registering and publishing services on behalf of a wireless device, according to some embodiments. In some embodiments, antenna 1435 may be coupled to processing element 1464. The processing element may be configured to perform the method described above in reference to FIG. 14A. In some embodiments, processing element 1464 may include one or more modules, such as modules (or circuitry) 1422-1426, and the modules (or circuitry) may be configured to perform various steps of the method described above in reference to FIG. 14A. In some embodiments, the processing element may be included in a wireless device, such as wireless station 106. In other embodiments, the processing element may be included in a radio module of a wireless device, such as wireless station 106. In other words, the processing element may be a baseband processor and may be coupled to one or more antennas of a wireless device or one or more receive and/or transmit chains of a wireless device. As shown, the modules may be configured as follows.

In some embodiments, processing element 1464 may include a receive module 1422 configured to receive a request to register one or more services for subscribing on behalf of a peer wireless device. In other words, a first neighboring (or peer) wireless device (e.g., LPN device 436) may send a service registration request to a peer wireless device (e.g., NAN proxy 416) as described above. The request may include at least an availability schedule of the peer (or neighboring) wireless device. In some embodiments, the request may include service information or a portion of service information, such as that described above in reference to FIGS. 9-13. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 9-13.

In some embodiments, processing element 1464 may include a send module 1424 configured to a confirmation of registration of the one or more services to the peer wireless device. In response to the confirmation, the peer wireless device may enter a hibernation (or sleep) mode (e.g., discontinue or pause transmission and receiving for a period of time) according to its wakeup schedule.

In some embodiments, processing element 1464 may include a subscribe module 1426 configured to subscribe to at least one service of the one or more services on behalf of the peer wireless device. The at least one service may be provided by a neighboring wireless device. In some embodiments, subscribing to the at least one service may include responding to a broadcast message and/or a unicast message advertising the availability of the at least one service. In some embodiments, subscribing to the at least one service may include sending, to the neighboring wireless device, service information, or a portion of service information, of the peer wireless device. The service information may be based on the request to register. In other words, information included in the request to register may be used to generate (or determine) the service information sent to the neighboring wireless device.

In some embodiments, subscribing to the at least one service may include sending, to the neighboring wireless device, a subscription request and/or determining a service match to at least one service based on information received from the neighboring wireless device. The service match may be determined based on at least information received from the neighboring wireless device and, in some embodiments, a comparison of the information received to information included in the request to register.

In some embodiments, the neighboring wireless device may then use the service information to meet (or rendezvous) with the peer device based on schedule information that may be included in the service information (e.g., awake or wake up time as well as channel/frequency/time availability of the peer device). Additionally, in some embodiment, a message may be sent to the neighboring wireless device indicating the peer wireless device's intent to subscribe to the at least one service. The message may include an availability schedule (e.g., a further availability parameter and/or a further availability schedule) of the peer wireless device. In some embodiments, the availability schedule may be sent based on the peer wireless device's wakeup schedule.

In some embodiments, a request for further service may be received and, in response, the additional (or further) service information may be sent to the neighboring wireless device. In some embodiments, the additional service information may include one or more (or at least one) of a wakeup schedule of the peer wireless device and/or a next available channel and time window of the peer wireless device.

In some embodiments, a service update request may be sent to the peer wireless device. The service update request may be sent according to the availability schedule of the peer wireless device. In addition, the service update for the at least one service may be received from the peer wireless device and service information associated with the at least one service may be updated based on the service update.

It is apparent for those skilled in the art that, for the particular processes of the modules (or circuitry) described above (such as modules 1422, 1424, and 1426), reference may be made to the corresponding steps (such as steps 1402, 1404, and 1406, respectively) in the related process embodiment sharing the same concept and the reference is regarded as the disclosure of the related modules (or circuitry) as well. Furthermore, processing element 1464 may be implemented in software, hardware or combination thereof. More specifically, processing element 1464 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1464 may be implemented as a general-purpose processor such as a CPU, and therefore each module can be implemented with the CPU executing instructions stored in a memory which perform a respective step.

Discovery Proxy Maintenance

In some embodiments, an NSDP device (such as NAN proxy 416) may require regular maintenance to update LPN registered services. For example, cached registration information may be outdated or a service may no longer be available (e.g., the LPN device may have woken up and may currently be in session with a NAN device). Additionally, a TTL of a service registered with the NSDP device may be expiring or close to expiring (e.g., 75% or more). Thus, in some embodiments, an NSDP device may query an LPN for a service update when the LPN wakes up. In response, the LPN may send (provide) the service update to the NSDP device if there is any service update regarding a service registered with the NSDP device.

In yet another example, negotiated parameters (on behalf of the LPN) among an NSDP device and a NAN device may be outdated (e.g. the NAN Device may no longer be available). Hence, in some embodiments, a NAN device may send a negotiated parameters update to an NSDP device when negotiated parameters change.

In some embodiments, when an NSDP device is no longer able to provide NSDP services (e.g., it leaves a NAN group), the NSDP device may send a notification to all registered LPNs that it will no longer offer proxying of the LPNs' services. Additionally, if an NSDP device unexpectedly disconnected (e.g., loses power), an LPN device may discover that the NSDP device is no longer available when it expects the NSDP device to query for a service update as a TTL is expiring and, in response, the LPN device may register with another NSDP device or may start publishing/subscribing service by itself.

Service De-registration

In some embodiments an LPN may de-register a service or services from an NSDP device (such as NAN proxy 416) if the LPN determines to wake up from sleep or determines to no longer offer the service or services. Additionally, in some embodiments, if an NSDP device does not receive a further update after a service TTL expires, the NSDP device may de-register a service associated with the TTL from its cache.

Figure 15A:
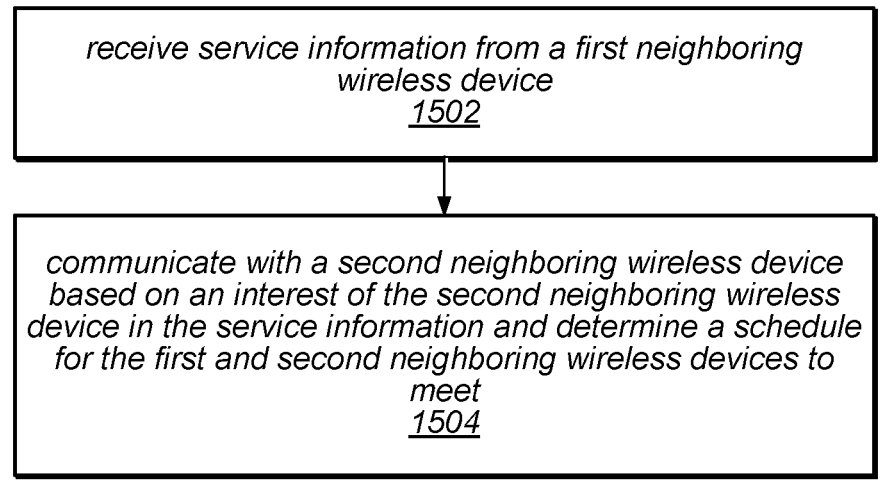
FIG. 15A illustrates an example method for scheduling communication between neighboring wireless devices, according to some embodiments.

FIG. 15A illustrates a method for scheduling communication between neighboring wireless devices, according to some embodiments. The method shown in FIG. 15A may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At 1502, service information may be received from a peer wireless device. In other words, a first neighboring (or peer) wireless device (e.g., LPN device 436) may send a service registration request to a peer wireless device (e.g., NAN proxy 416) as described above. The request may include at least an availability schedule of the peer (or neighboring) wireless device. In some embodiments, the request may include service information or a portion of service information, such as that described above in reference to FIGS. 9-13. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 4-7 and 9-13.

At 1504, communication with a neighboring wireless device may be performed based on an interest of the neighboring wireless device in the service information and a schedule for the neighboring wireless device and the peer device to meet (or rendezvous) may be determined. In some embodiments, the determined schedule may then be sent to the peer wireless device. In some embodiments the determined schedule may be based on availability of the peer wireless device and the availability may be included in the service information. In other words, in some embodiments, determining the schedule may include sending the service information to the neighboring wireless device.

In some embodiments, determining the schedule may include receiving, from the neighboring wireless device, a first message indicating an intent for the neighboring wireless device to subscribe to at least one service of one or more services included in the service information, and sending, according to an availability schedule of the peer wireless device included in the service information, a second message to the peer wireless device. In some embodiments, the first and second messages may include an availability schedule of the neighboring wireless device.

In some embodiments, communicating with the neighboring wireless device may include receiving, from the neighboring wireless device, a subscription request and determining, based on the subscription request, a service match to at least one service of one or more services included in the service information. In addition, communicating may include sending, to the neighboring wireless device, the service information based on the subscription request.

In some embodiments, communicating with the neighboring wireless device may include receiving, from the neighboring wireless device, a first message publishing a service and determining, based on the service information, a service match. In addition, communicating may include subscribing, on behalf of the peer wireless device, to the service. In some embodiments, subscribing to the service may include sending the service information to the neighboring wireless device.

Figure 15B:
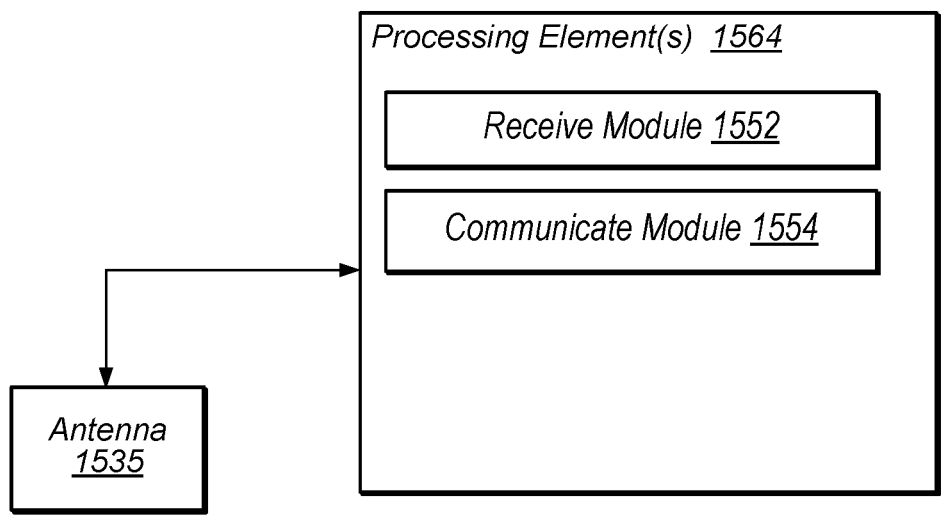
FIG. 15B illustrates an example processing element including modules for scheduling communication between neighboring wireless devices, according to some embodiments.

FIG. 15B illustrates a processing element including modules for scheduling communication between neighboring wireless devices, according to some embodiments. In some embodiments, antenna 1535 may be coupled to processing element 1564. The processing element may be configured to perform the method described above in reference to FIG. 15B. In some embodiments, processing element 1564 may include one or more modules, such as modules (or circuitry) 1552-1556, and the modules (or circuitry) may be configured to perform various steps of the method described above in reference to FIG. 15A. In some embodiments, the processing element may be included in a wireless device, such as wireless station 106. In other embodiments, the processing element may be included in a radio module of a wireless device, such as wireless station 106. In other words, the processing element may be a baseband processor and may be coupled to one or more antennas of a wireless device or one or more receive and/or transmit chains of a wireless device. As shown, the modules may be configured as follows.

In some embodiments, processing element 1564 may include a receive module 1552 configured to receive service information from a peer wireless device. In other words, a first neighboring (or peer) wireless device (e.g., LPN device 436) may send a service registration request to a peer wireless device (e.g., NAN proxy 416) as described above. The request may include at least an availability schedule of the peer (or neighboring) wireless device. In some embodiments, the request may include service information or a portion of service information, such as that described above in reference to FIGS. 9-13. For example, in some embodiments the service information may include one or more (or at least one) of a medium access control (MAC) address of the peer wireless device, a wakeup schedule of the peer wireless device, a publish mode (e.g., solicited publish, unsolicited publish, or both) of the peer wireless device, a subscribe mode (e.g., passive subscribe, active subscribe, or both), a description of the one or more services (e.g., a service ID (identification) (e.g., a service hash), an instance ID (e.g., a publish_ID or a subscribe_ID), a requestor instance ID, and/or a service control) of the peer wireless device, and/or a further availability schedule of the peer wireless device (e.g., one or more of a wake up schedule and/or a further availability map attribute). The service information may also include additional fields (parameters) as described in reference to FIGS. 4-7 and 9-13.

In some embodiments, processing element 1564 may include a communicate module 1554 configured to communicate with a neighboring wireless device based on an interest of the neighboring wireless device in the service information and determine a schedule for the neighboring wireless device and the peer device to meet (or rendezvous). In some embodiments, the determined schedule may then be sent to the peer wireless device. In some embodiments the determined schedule may be based on availability of the peer wireless device and the availability may be included in the service information. In other words, in some embodiments, determining the schedule may include sending the service information to the neighboring wireless device.

In some embodiments, determining the schedule may include receiving, from the neighboring wireless device, a first message indicating an intent for the neighboring wireless device to subscribe to at least one service of one or more services included in the service information, and sending, according to an availability schedule of the peer wireless device included in the service information, a second message to the peer wireless device. In some embodiments, the first and second messages may include an availability schedule of the neighboring wireless device.

In some embodiments, communicating with the neighboring wireless device may include receiving, from the neighboring wireless device, a subscription request and determining, based on the subscription request, a service match to at least one service of one or more services included in the service information. In addition, communicating may include sending, to the neighboring wireless device, the service information based on the subscription request.

In some embodiments, communicating with the neighboring wireless device may include receiving, from the neighboring wireless device, a first message publishing a service and determining, based on the service information, a service match. In addition, communicating may include subscribing, on behalf of the peer wireless device, to the service. In some embodiments, subscribing to the service may include sending the service information to the neighboring wireless device.

It is apparent for those skilled in the art that, for the particular processes of the modules (or circuitry) described above (such as modules 1552 and 1554), reference may be made to the corresponding steps (such as steps 1502 and 1504, respectively) in the related process embodiment sharing the same concept and the reference is regarded as the disclosure of the related modules (or circuitry) as well. Furthermore, processing element 1564 may be implemented in software, hardware or combination thereof. More specifically, processing element 1564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1564 may be implemented as a general-purpose processor such as a CPU, and therefore each module can be implemented with the CPU executing instructions stored in a memory which perform a respective step.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio configured to perform Wi-Fi communication with a Wi-Fi access point;
   at least one processor in communications with the at least one radio;
   wherein the at least one processor is configured to cause the wireless device to:
   receive, from a first neighboring wireless device, a request to register one or more services to publish on behalf of the first neighboring wireless device, wherein the request includes at least an availability schedule associated with the first neighboring wireless device and a publish mode of the first neighboring wireless device, wherein the publish mode indicates at least one of a solicited publish mode, an unsolicited publish mode, or a solicited and unsolicited publish mode, and wherein the availability schedule indicates one or more of a wakeup schedule of the first neighboring wireless device or a next available channel and time window of the first neighboring wireless device;
   transmit, to the first neighboring wireless device, confirmation of registration of the one or more services;
   publish, based in part on the publish mode and on behalf of the first neighboring wireless device, the one or more services to a second neighboring wireless device; and
   transmit, in response to a request for additional service information from the second neighboring wireless device, additional service information comprising one or more of the wakeup schedule of the first neighboring wireless device or the next available channel and time window of the first neighboring wireless device.

2. The wireless device of claim 1,
   wherein, to publish the one or more services, the at least one processor is further configured to cause the wireless device to:
   transmit, to the second neighboring wireless device, service information based on the request to register.

3. The wireless device of claim 1,
   wherein the at least one processor is further configured to cause the wireless device to:
   receive, from the second neighboring wireless device, a first message indicating an intent for the second neighboring wireless device to subscribe to at least one service of the one or more services, wherein the first message includes an availability schedule associated with the second neighboring wireless device; and
   transmit, according to the availability schedule associated with the first neighboring wireless device, a second message to the first neighboring wireless device, wherein the second message includes the availability schedule associated with the second neighboring wireless device.

4. The wireless device of claim 1,
   wherein, to publish the one or more services, the at least one processor is further configured to cause the wireless device to:
   receive, from the second neighboring wireless device, a subscription request;
   determine, based on the subscription request, a service match to at least one of the one or more services; and
   transmit, to the second neighboring wireless device, service information based on the subscription request.

5. The wireless device of claim 1,
   wherein the at least one processor is further configured to cause the wireless device to:
   transmit, to the first neighboring wireless device, a service update request for at least one of the one or more serviced registered with the wireless device, wherein the request is sent according to the availability schedule of the first neighboring wireless device; and
   receive, from the first neighboring wireless device, the service update for the at least one service.

6. The wireless device of claim 1,
   wherein the request further includes service information comprising one or more of:
   a medium access control address of the first neighboring wireless device;
   a subscribe mode of the first neighboring wireless device;
   a description of the one or more services; or
   a further availability schedule of the first neighboring wireless device.

7. The wireless device of claim 1,
   wherein the publish mode indicates a solicited publish, and wherein, to publish the one or more services to the second neighboring wireless device, the at least one processor is further configured to cause the wireless device to:
   switch the solicited publish to an unsolicited publish; and
   perform an unsolicited publish on behalf of the first neighboring wireless device.

8. An apparatus, comprising:
   a memory; and
   at least one processor in communications with the memory, wherein the at least one processor is configured to:
   receive, from a first neighboring wireless device, a request to register one or more services to publish or subscribe to on behalf of the first neighboring wireless device, wherein the request includes at least an availability schedule of the first neighboring wireless device, wherein the first neighboring wireless device that is configured to perform Wi-Fi communications, and wherein the availability schedule indicates one or more of a wakeup schedule of the first neighboring wireless device or a next available channel and time window of the first neighboring wireless device; and
   communicate, on behalf of the first neighboring device, with a second neighboring wireless device that is configured to perform Wi-Fi communications, wherein the communicating is based on an interest of the second neighboring wireless device in one or more of the services, wherein the communicating includes transmission of additional service information to the second neighboring wireless device and determination of a schedule for the first and second neighboring wireless devices to communicate, wherein the additional service information includes one or more of a wakeup schedule of the first neighboring wireless device or a next available channel and time window of the first neighboring wireless device, and wherein the schedule accommodates the wakeup schedule of the first neighboring wireless device.

9. The apparatus of claim 8,
wherein the at least one processor is further configured to:
   transmit, based at least in part on the wakeup schedule, the schedule to the first neighboring wireless device.

10. The apparatus of claim 8,
wherein the schedule is based on availability of the first neighboring wireless device, wherein the availability is included in the service information.

11. The apparatus of claim 8,
wherein the service information further comprises one or more of:
   a medium access control address of the first neighboring wireless device;
   a publish mode of the first neighboring wireless device;
   a subscribe mode of the first neighboring wireless device;
   a description of the one or more services; or
   a further availability schedule of the first neighboring wireless device.

12. The apparatus of claim 8,
wherein, to determine the schedule, the at least one processor is further configured to:
   receive, from the second neighboring wireless device, a first message indicating an intent for the second neighboring wireless device to subscribe to at least one service of one or more services included in the service information, wherein the first message includes an availability schedule associated with the second neighboring wireless device; and
   transmit a second message to the first neighboring wireless device, wherein the second message includes the availability schedule associated with the second neighboring wireless device, and wherein the second message is cached, based in part on a wakeup schedule of the first neighboring wireless device, for a period of time after the first message is received.

13. The apparatus of claim 8,
wherein, to communicate with the second neighboring wireless device, the at least one processor is further configured to:
   receive, from the second neighboring wireless device, a subscription request;
   determine, based on the subscription request, a service match to at least one service of one or more services included in the service information; and
   transmit, to the second neighboring wireless device, the service information based on the subscription request.

14. The apparatus of claim 8,
wherein, to communicate with the second neighboring wireless device, the at least one processor is further configured to:
   receive, from the second neighboring wireless device, a first message publishing a service;
   determine, based on the service information, a service match; and
   subscribe, on behalf of the first neighboring wireless device, to the service, wherein to subscribe to the service, the apparatus is configured to send the service information to the second neighboring wireless device.

15. A non-transitory computer readable memory medium storing program instructions executable by a processor to:
   receive, from a first neighboring wireless device, a request to register, on behalf of the first neighboring wireless device, for a service that is available for subscription, wherein the request includes at least an availability schedule of the first neighboring wireless device and a subscribe mode of the first neighboring wireless device, wherein the subscribe mode indicates at least one of a passive subscribe mode, an active subscribe mode, or a passive and active subscribe mode, and wherein the availability schedule indicates one or more of a wakeup schedule of the first neighboring wireless device or a next available channel and time window of the first neighboring wireless device;
   transmit, to the first neighboring wireless device, confirmation of registration for the service;
   subscribe, based at least in part on the subscribe mode and on behalf of the first neighboring wireless device, to the service, wherein the service is provided by a second neighboring wireless device; and
   transmit, to the second neighboring wireless device, additional service information based on the request to register, wherein the additional service information comprises one or more of the wakeup schedule of the first neighboring wireless device or the next available channel and time window of the first neighboring wireless device.

16. The non-transitory computer readable memory of claim 15,
wherein, to subscribe to the service, the program instructions are further executable to:
   transmit, to the second neighboring wireless device, service information based on the request to register.

17. The non-transitory computer readable memory medium of claim 16,
wherein the service information further comprises one or more of:
   a medium access control address of the first neighboring wireless device;
   a publish mode of the first neighboring wireless device;
   a subscribe mode of the first neighboring wireless device;
   a description of the one or more services; or
   a further availability schedule of the first neighboring wireless device.

18. The non-transitory computer readable memory of claim 15,
wherein the program instructions are further executable to:
   transmit, to the second neighboring wireless device, a message indicating an intent for the first neighboring wireless device to subscribe to the service, wherein the message includes an availability schedule associated with the first neighboring wireless device.

19. The non-transitory computer readable memory of claim 15,
wherein the program instructions are further executable to:

transmit, to the first neighboring wireless device, a message including an availability schedule associated with the second neighboring wireless device, wherein the message is cached for a period of time after the availability schedule is received, wherein the period of time is based on a wakeup schedule of the first neighboring wireless device.

20. The non-transitory computer readable memory of claim 15,
wherein the subscribe mode indicates a passive subscribe, wherein, to subscribe to the service, the program instructions are further executable to:
switch the passive subscribe to an active subscribe; and
perform an active subscribe on behalf of the first neighboring wireless device.

* * * * *